April 28, 1959  W. E. JOHNSON ET AL  2,884,271
ANCHORING APPARATUS FOR FLEXIBLE CABLES
Filed May 4, 1956
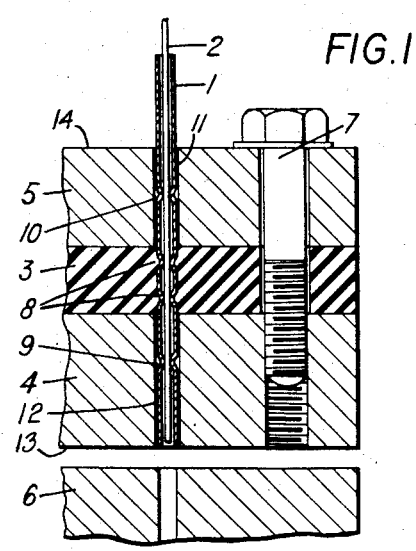
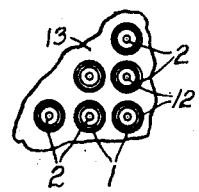
Inventors
WILLIAM E. JOHNSON & JOHN C. DAVY
By United States Patent Office 2,884,271
Patented Apr. 28, 1959

2,884,271
ANCHORING APPARATUS FOR FLEXIBLE CABLES
William Edward Johnson, Streathem, London, and John Colin Davy, Woldingham, England, assignors to Powers-Samas Accounting Machines Limited, London, England, a British company
Application May 4, 1956, Serial No. 582,798
Claims priority, application Great Britain May 31, 1955
3 Claims. (Cl. 287—75)

This invention relates to apparatus for anchoring an end of a flexible cable consisting of a tubular sheath within which a wire is housed for lengthwise movement relative thereto.

As is well understood, the devices at present in use for anchoring the ends of cables of the kind mentioned above usually consist of nuts and sleeves which are relatively expensive to produce, need individual adjustment when a plurality of cables are to be anchored in juxtaposition and prevent juxtaposition of cables at a pitch less than that of the size of the nuts while allowing for manipulation thereof.

It is an object of the present invention to provide apparatus for anchoring the ends of flexible cables, which apparatus is relatively cheap to produce, is easy to assemble and adjust, and permits the cable-ends to be anchored at a very close pitch.

In order that the invention may be clearly understood, one embodiment thereof will now be described, by way of example, with reference to the accompanying drawings in which:

Fig. 1 illustrates in section, a part of an assembly, according to the invention, and Fig. 2 is a top plan of a part of an assembly according to the invention.

Referring to the drawings, each flexible cable consists of a tubular sheath 1 comprising a thin metal tube in which a wire 2 is housed for lengthwise movement relative thereto. It is, however, to be understood that the flexible cable may be of any other suitable kind which consists of a metal sheath which permits a wire housed therein to be movable lengthwise relative thereto.

The apparatus by which the end portions of the cables are anchored comprises a compressible sheath-gripping member 3 sandwiched between a pair of rigid flat clamping plates 4, 5 of which one plate 4 may be supported in a fixed position relative to a machine part, such for example as a sensing plate 6 with which the wire 2 is to co-operate. In one convenient form the sheath-gripping member 3 consists of a block of rubber.

The clamping plates 4, 5 and the sheath-gripping member 3 are each provided with apertures 11, 12 extending therethrough and into which the end portion of a cable can be pushed for location therein, as illustrated in Fig. 1, and to provide for the wire 2 being movable lengthwise through and beyond opposite faces 13, 14 of the plates. After the ends of each of the cables have been so located the sheath-gripping members 3 are compressed by reason of the plates 4, 5 being drawn together, for example by screws 7, and compression of the member 3 causes constriction thereof around the cable-end portions extending therethrough thereby to anchor the cable-ends relative to the clamping plates.

In one embodiment of the invention the portion of the sheath 1 which is gripped by the member 3 is provided with indentations 8 which assist the gripping action of the member 3 on constriction thereof and also serve as guides for the wire 2. The sheath 1 is also provided with additional indentations 9, 10 in the regions thereof which are located respectively in the plate 4 and in the plate 5 and these additional indentations also serve as guides for the wire 2. The indentations may be spaced round the sheath 1 but in a preferred form they consist of annular beads or grooves.

From the foregoing description it will be understood that the plates 4, 5 and member 3 can be of any desired dimensions so as to accommodate a plurality of flexible cables, as indicated in Fig. 2, and that, because the cables are clamped in position without the use of fixing devices individual thereto, the cables can be located very closely adjacent one to the other. Further, all cables can be fixed simultaneously by the tightening of screws 7 arranged along the edges of the apparatus where there is freedom of adjustment.

We claim:
1. An assembly for anchoring a flexible control cable, comprising a compressible block, a pair of substantially flat clamping plates sandwiching said block, a bore formed through said block and plates, a cable comprising an outer sheath and a wire housed within the sheath and which is longitudinally movable with respect thereto, an end portion of said sheath extending into said bore from one end thereof and permitting lengthwise movement of said wire through and beyond the opposite end of said bore, annularly disposed indentations in the end portion of said sheath and defining external recesses and internal projections, clamping means joining said plates and spaced from said bore for drawing the clamping plates toward each other and compressing said block sufficiently to cause constriction thereof about said sheath to force portions of said block into said recesses to constrain the sheath against lengthwise movement thereof relative to the clamping plates, said projections engaging the wire to form a guide bearing which confines the movement of the end portion of said wire along the center axis of said sheath so that the wire may be accurately guided for properly sensing openings.

2. An assembly for anchoring a plurality of cables closely adjacent each other, comprising a compressible block, a pair of substantially flat clamping plates sandwiching said block, a plurality of closely adjacent parallel bores formed through said block and plates, a plurality of cables each including an outer sheath and a wire housed within the sheath and which is longitudinally movable with respect thereto, an end portion of each sheath extending into one end of each bore and respectively permitting lengthwise movement of the end of each wire through and beyond the opposite ends of said bores, annularly disposed indentations in the end portion of each sheath and defining external recesses and internal projections, clamping means joining said plates and spaced from said bores for drawing the clamping plates toward each other and compressing said block sufficiently to cause constriction thereof about each sheath to force portions of said block into said recesses to constrain the sheaths against lengthwise movement thereof relative to the clamping plates, said projections engaging each wire to form guide bearings which confine the movement of the end portion of each wire along the center axis of each sheath so that each wire may be accurately guided for properly sensing openings, whereby a plurality of sensing wires are rigidly secured in closely spaced relation.

3. The assembly of claim 1 wherein said sheath is flexible and of such a larger diameter than said wire that the sheath may be positioned into loops and curves without restraining the wire from lengthwise movement therethrough.

References Cited in the file of this patent
UNITED STATES PATENTS

| 2,170,393 | Tornblom | Aug. 22, 1939 |
| 2,605,315 | Hargett | July 29, 1952 |